United States Patent [19]
Roy

[11] 3,923,209
[45] Dec. 2, 1975

[54] RUNNER MANIFOLD FOR INJECTION MOLDING MACHINE

[75] Inventor: Siegfried S. Roy, Darien, Conn.

[73] Assignee: Continental Can Company, Inc., New York, N.Y.

[22] Filed: Nov. 5, 1974

[21] Appl. No.: 521,092

[52] U.S. Cl. .................. 222/478; 222/330; 425/247
[51] Int. Cl.² .. G01F 11/00; B28B 1/24; B29F 1/06; B29F 1/08
[58] Field of Search ............ 249/110; 425/247, 248, 425/249, 250, 245, 245 NS, 77, 174.6; 264/329; 222/478, 485, 486; 164/320

[56] References Cited
UNITED STATES PATENTS

| | | |
|---|---|---|
| 2,239,338 | 4/1941 | Norelli ............................. 425/450 |
| 3,026,567 | 3/1962 | Scott ................................. 425/245 |
| 3,179,979 | 4/1965 | Bundy ................................ 425/77 |
| 3,477,097 | 11/1969 | Plymale .......................... 222/330 X |

*Primary Examiner*—Francis S. Husar
*Assistant Examiner*—John S. Brown
*Attorney, Agent, or Firm*—H. Lawrence Smith; William A. Dittmann; Joseph E. Kerwin

[57] ABSTRACT

A runner manifold in which a number of sector-shaped elements are interposed between a hub member and a clamping ring, the lateral faces of the sector-shaped elements being provided with elongate recesses which cooperate to define runner passages for connecting injection nozzles with a source of synthetic resinous material in an injection molding machine.

17 Claims, 4 Drawing Figures

RUNNER MANIFOLD FOR INJECTION MOLDING MACHINE

BACKGROUND OF THE INVENTION

This invention relates to injection molding, and more particularly, to a runner manifold for conducting a synthetic resinous material in a flowable state from a source thereof to a plurality of injection nozzles in an injection molding machine.

Injection molding machines, of the type in which a plurality of molds are filled simultaneously, customarily employ a runner manifold to distribute the material to be molded to the injection nozzles. The manifold is conventionally formed of a single block, runner passages being bored in the block from its outer surfaces. The interiors of the bores are virtually inaccessible, thereby inhibiting modification, adjustment or fine machining. Further, cleaning of such runner passages is difficult and time-consuming. If, as is the usual case, any changes of direction are required, each runner passage is formed of two or more intersecting bores, thereby imposing abrupt changes in the direction of flow. Certain polymers are adversely sensitive to such abrupt changes or the consequent turbulence.

To avoid these disadvantages, split manifolds have been proposed which comprise a pair of manifold halves clamped or fastened together during injection. Half of each runner passage is provided in each of the adjacent faces of the manifold halves in the form of a recess or channel. Accordingly, the longitudinal axes of the passages normally lie in a single plane at the interface of the manifold halves, whereby the configuration of the passages, as well as the pattern in which the molds may be arrayed, is largely restricted. More importantly, the internal pressures acting on the wall of the runner passages tend to force the manifold halves apart, and therefore relatively great clamping forces are required to prevent leakage. The problem becomes acute in the face of relatively large internal pressures, in the range of 10,000 to 25,000 p.s.i. and greater, which may be necessary or desirable in employing certain synthetic resins and/or certain injection molding techniques.

It has been known for some time that large internal pressures can be contained advantageously by surrounding the source of pressure with sector-shaped elements compressively engaged by an outer ring, each element thereby supporting adjacent elements laterally and transmitting to the outer ring forces from the central pressure, where they are distributed uniformly with relatively moderate effect on the ring. Just such an arrangement is disclosed in U.S. Pat. 2,554,499 issued May 29, 1951 to T. C. Poulter, which describes and illustrates a device for generating very high pressures. Here the pressure fluid is wholly confined in a central hollow tube in which opposing pistons are received at either end. There is no flow, and the generation of high pressures is, in itself, the purpose of such a device.

SUMMARY OF THE INVENTION

The present invention provides a runner manifold in which a central hub member is surrounded and engaged by sector-shaped elements, which are in turn surrounded and engaged by a clamping ring. The engaged lateral faces of each pair of adjacent sector-shaped elements are provided with recesses which cooperate to define a runner passage extending from a respective inlet port in the hub member to an outlet in an exterior surface defined by the sector-shaped elements. The inlet ports are arranged to communicate with a source of synthetic resin in a flowable state.

THE PREFERRED EMBODIMENT

Figure 1:
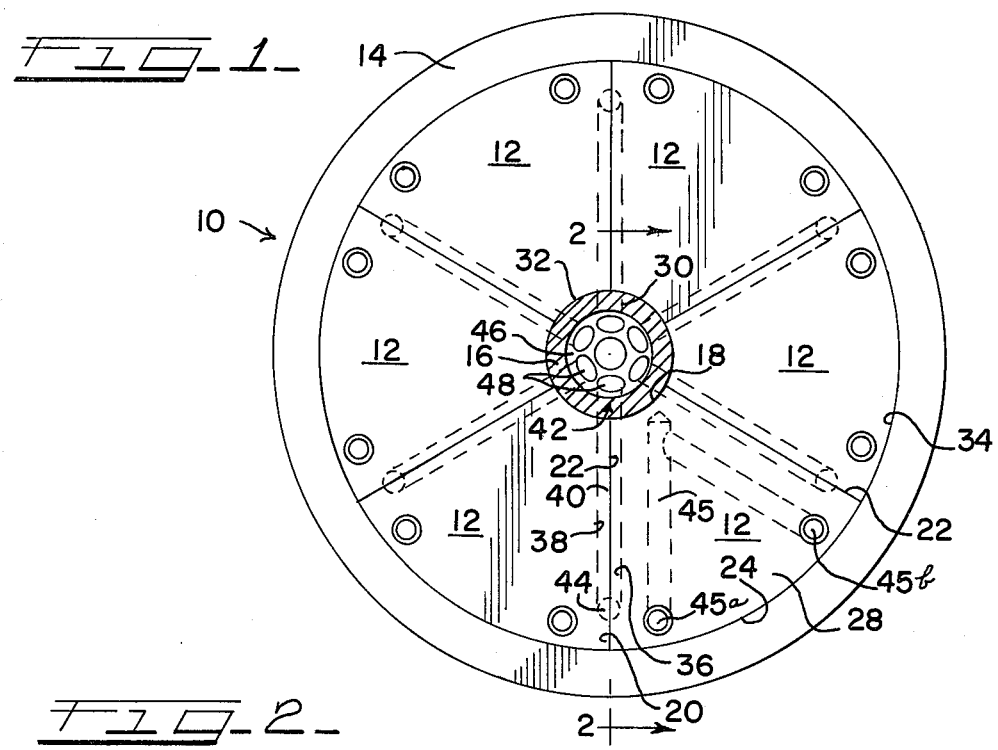
FIG. 1 is an end elevational view, partially in cross section, of a runner manifold constructed in accordance with the invention.
Figure 2:
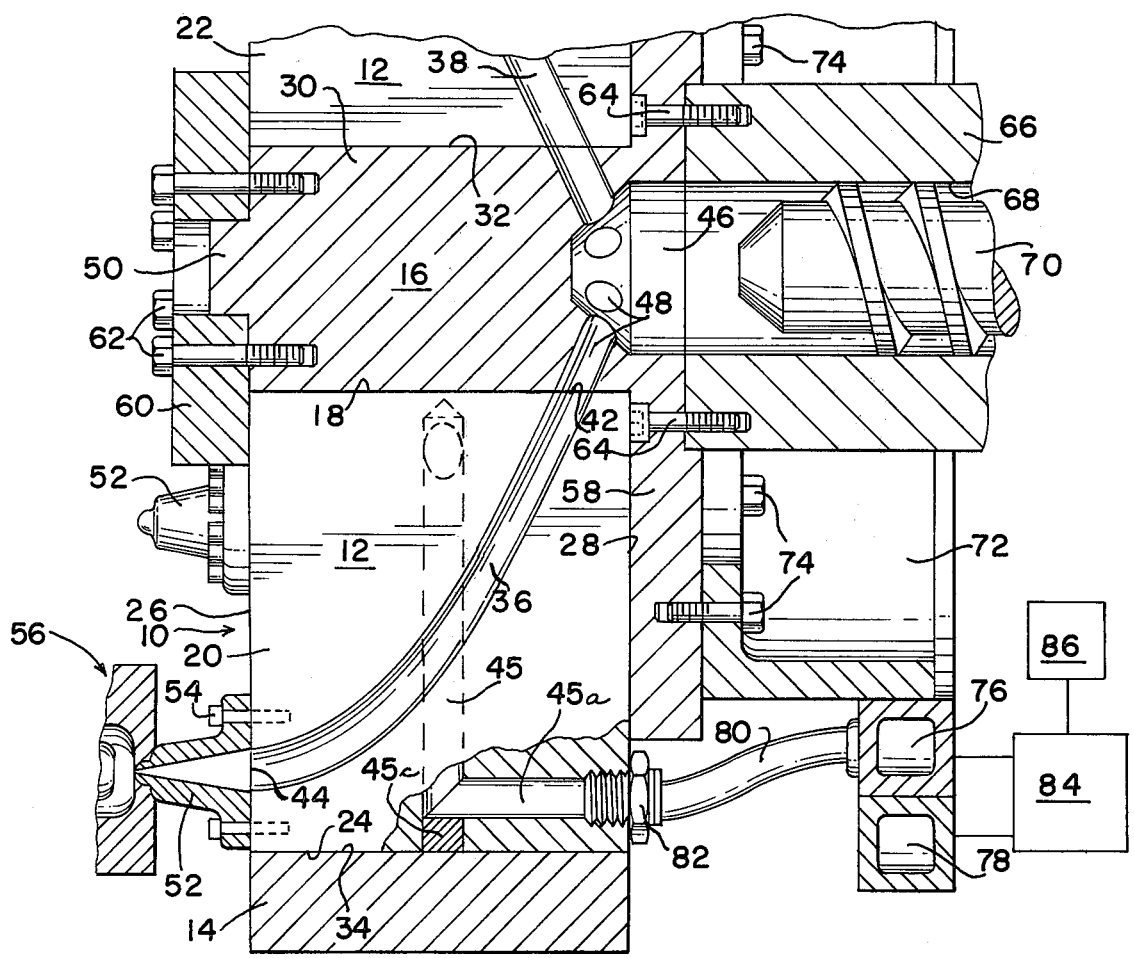
FIG. 2 is a sectional view of the runner manifold taken along the line 2—2 of FIG. 1 and showing adjacent features of an injection molding machine in which the runner manifold is assembled.
Figure 3:
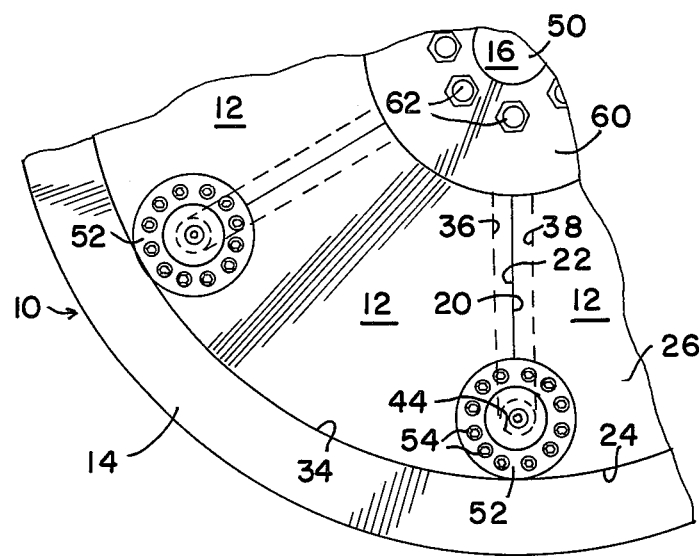
FIG. 3 is a partial elevational view of the runner manifold taken from an end opposite that of FIG. 1.

Referring to FIGS. 1, 2 and 3, a preferred embodiment of a runner manifold 10 in accordance with the invention comprises a plurality of sector-shaped elements 12 interposed between a clamping ring 14 and a hub member 16.

As illustrated, sector-shaped elements 12 are six in number, but any plurality may be employed within practicable limits, as explained hereinafter. Each is identical with the others in form and is bounded by six faces, namely a curved inner face 18, a pair of generally rectangular and planar lateral faces 20 and 22 which diverge radially outwardly from the inner face, a curved outer face 24, a sector-like forward end face 26 and a sector-like rearward end face 28.

Inner faces 18 cooperate to define a cylindrical radially inner surface in engagement with a hub portion 30 of hub member 16 formed with a cylindrical outer support surface 32 which is complementary to the radially inner surface. The engaged surfaces may take other forms; for example, they may be conical, whereby to provide a press fit, or hub portion 30 may be of prismatic form and inner faces 18 planar; however, the cylindrical form permits relative ease and accuracy of machining and assists the equable distribution of forces acting on the engaged surfaces.

Outer faces 24 cooperate to define a cylindrical radially outer surface which is concentric with the radially inner surface and which is in engagement with a complementary inner cylindrical surface 34 of clamping ring 14.

End faces 26 cooperate to define a generally planar forward end surface. Similarly, a generally planar rearward end surfaces, parallel with and opposed to the forward end surface, is defined by end faces 28.

Formed in each lateral face 20 is an elongate recess 36 of semicircular cross section, which at one of its ends intersects inner face 18, extending therefrom in a generally continuous curve to traverse face 20, and which at its other end intersects end face 26, thereby dividing face 22 into two coplanar portions on opposite sides of the recess. Each lateral face 22 is similarly provided with a recess 38 of form and dimensions identical with those of recess 36 but reversed relative thereto, whereby recesses 36 and 38 are mirror images of each other. Thus, when lateral face 20 of any sector-shaped element 12 is in engagement with the corresponding lateral face 22 of an adjacent sector-shaped element, as illustrated in FIGS. 1 and 3, the respective recesses 36 and 38 are aligned and cooperate to define a runner passage 40 having an inlet 42 at the radially inner surface defined by faces 18 and an outlet 44 at the forward end surface defined by faces 26. Runner passages 40 will of course be equal in number to sector-shaped elements 12.

Each sector-shaped element 12 is provided with an internal heating passage 45, one of which is represented in its entirety by interrupted lines in FIG. 1 and primarily by interrupted lines in FIG. 2. Each heating passage is formed by a pair of intersecting bores generally parallel with lateral faces 20 and 22, respectively, and permanently closed at their outer ends by plugs, one of which is visible at 45c in FIG. 2. A second pair of bores, which extend inwardly from end face 28 and intersect heating passage 45 at right angles therewith, provide a heating inlet 45a and a heating outlet 45b.

Hub member 16 is provided at its rearward end with a hollow or concavity 42 of any suitable form which a plurality of inlet ports 48, equal in number to runner passages 40, diverge to intersect surface 32, each inlet port being aligned with one of runner passages 40 and thereby being in direct communication with the respective runner passage inlet 42. At the forward end of hub member 16 there is provided a cylindrical hub extension 50, of reduced cross section relative to hub portion 30, which projects beyond the plane of the forward end surface defined by end faces 26.

As illustrated in FIGS. 2 and 3, a plurality of injection nozzles 52 are secured to manifold 10 by any suitable means such as socket-head machine screws 54. Each nozzle is in communication with outlet 44 of a respective one of runner passages 40 and overlies equal portions of adjacent sector-shaped elements 12. During injection, nozzles 52 are held in engagement with any desired molds suitable for injection molding (one of which is represented fragmentarily at 56 in FIG. 2) by any one of a number of well-known clamping means (not shown).

Hub member 16 is provided with an annular flange 58 which extends radially outwardly of hub support surface 32 and engages the greater portion of the rearward end surface defined by end faces 28 of the sector-shaped elements. At the forward end of hub member 16 a retaining ring 60 is carried by hub extension 50 and is secured against movement relative to the hub member by any suitable fastening means such as machine bolts 62. Retaining ring 60 engages end faces 26 to preclude movement of sector-shaped elements 12 in a forward direction relative to hub member 16. Flange 58 precludes such movement in a rearward direction, and because of its relatively large diameter, it also acts to preclude any cocking or shewing of the sector-shaped elements relative to each other and to hub member 16.

Referring to FIG. 2, hub member 16, and thus manifold 10 when assembled, is secured in an injection molding machine by any suitable means such as socket-head machine screws 64. More particularly, flange 58 is shaped to receive a plasticizer barrel 66 of the injection molding machine, screws 64 being inserted through holes formed in flange 58 to be threadedly received in barrel 66. Additional support for manifold 10 may be provided as necessary. A cylinder 68 defined by barrel 66 is aligned with concavity 46, a reciprocating plasticizer screw 70 being received in the cylinder. The screw and cylinder cooperate is well-known manner to comprise a source of synthetic resinous material in a flowable state, as briefly explained hereinbelow.

While the screw-and-cylinder arrangement shown is frequently employed in the injection molding of thermoplastics, the invention may be used with any suitable source of material. Further, the invention is not limited to use with thermoplastics but also finds application in the injection molding of thermosets.

Concentric with barrel 66 and secured to flange 58 by any suitable means, such as machine bolts 74, is an annular mounting member 72 on which an annular heating intake conduit 76 is mounted as by brazing or welding (not shown). An annular heating discharge conduit 78 is, in turn, mounted on the intake conduit by similar means. Intake conduit 76 communicates with each of heating inlets 45a by means of a flexible hose 80, one of which is visible in FIG. 2, and which is secured in position in the respective sector-shaped element 12 by a threaded fitting 82. Similar hose and fitting arrangements, none of which is visible in the drawings, provide communication between heating outlets 45b and discharge conduit 78.

Heating conduits 76 and 78 are in communication with a source 84 of heating medium, shown diagrammatically in FIG. 2, which is connected to a temperature control device 86. Heating medium source 84 includes a source of heat and suitable pump means, neither of which is shown.

Assembly of manifold 10 is accomplished with relative ease and will be largely apparent from the foregoing description. Briefly, mounting member 72, together with heating conduits 76 and 78, is fastened to flange 58, and thus to hub member 16 by means of bolts 74, and hub member 16 is secured to barrel 66 by means of screws 42. A subassembly is formed by positioning sector-shaped elements 12 within clamping ring 14, thereby providing a central opening defined by inner faces 18 of the sector-shaped elements. The subassembly is then mounted on hub member 16, hub portion 30 being received in the central opening. At this point runner passages 40 are aligned with inlet ports 48, which may be done by means of registry marks (not shown), for example, provided on the hub member and on forward end faces 26. Retaining ring 60 is placed over hub extension 50 and secured to the hub member by means of bolts 62 which, when tightened, urge ring 60 into firm engagement with forward end faces 26. This in turn urges sector-shaped elements 12, and more particularly rearward end faces 28, into firm engagement with flange 58, thereby axially positioning the sector-shaped elements precisely relative to hub member 16. Injection nozzles 52 are now mounted on forward end faces 26 by means of screws 54, flexible hoses 80 are secured in position by means of threaded fittings 80, and heating conduits 76 and 78 are connected to heating medium source 84 to complete assembly of the runner manifold with the injection molding machine. It will be apparent, however, that the precise order of the assembly steps just described may be varied as desired within the limitations imposed by the particular physical characteristics of the various elements. Disassembly is accomplished as readily as assembly, essentially by reversing the foregoing procedure.

Compressive prestresses may be imparted to the sector-shaped elements and the hub member by means of either of two preferred procedures, as follows.

Sector-shaped elements 12 on the one hand, and clamping ring 14 on the other, may be formed of material having different predetermined coefficients of expansion, two such alloys of steel for example, the material selected for the sector-shaped elements having the greater coefficient of expansion. Thus, when manifold 10 is heated by means of heating passages 45, the sector-shaped elements will expand at a greater rate than the clamping ring, thereby giving rise to compressive prestresses acting on the sector-shaped elements and distributed over faces 18, 20, 22 and 24. The hub member will also be subjected to compressive prestresses distributed over support surface 32, while clamping ring 14 will be subjected to tensile prestresses.

Alternatively, the sector-shaped elements and the clamping ring may be formed of the same material, the clamping ring being preheated and shrink-fitted over outer faces 24 of the sector-shaped elements by being allowed to cool.

The compressive prestresses act to hold adjacent lateral faces 20 and 22 in firm engagement to seal the respective runner passage 40 longitudinally, and also act to hold inner faces 18 in firm engagement with support surface 32 to effect a seal at the juncture of each inlet port 48 and the respective runner passage inlet 42.

Turning briefly to operation of manifold 10, heating medium source 84 is energized, and temperature control 86 is adjusted to maintain a heating medium temperature which will in turn maintain the synthetic resinous material in a flowable state within the manifold. The heating medium, which is suitably a temperature-stable oil, is circulated from source 84 to heating intake conduit 76, thence to heating passages 45 by way of flexible hoses 80 and heating inlets 45a. The heating medium is withdrawn from the heating passages by way of heating outlets 45b and the associated flexible hoses (not shown) to heating discharge conduit 78, whence it is returned to source 84 and heated to repeat the cycle.

When the manifold has reached its operating temperature, a thermoplastic material in pellet or granulated form is introduced to cylinder 68 at a location removed from concavity 46, and plasticizer screw 70 is rotated to knead the plastic in cooperation with the wall of the cylinder. The plastic is thereby heated and reduced to a flowable state. (Plasticizer barrel 66 may include heating elements to provide a supplementary source of heat.) As the screw rotates, concavity 46 is filled with flowable plastic, and further accumulation of plastic acts to move the screw to the right as viewed in FIG. 2. When a sufficient amount of flowable plastic has been accumulated, the screw is moved to the left as viewed in FIG. 2 to fill inlet ports 48, runner passages 40 and nozzles 52 with plastic and thereby place the injection molding machine in condition for continuous operation.

Molds 56 are then clamped in engagement with nozzles 52. When a sufficient amount of plastic has again been accumulated, screw 70 is moved to the left once more to fill the molds. The molds are removed from the nozzles and the injection procedure repeated continuously or intermittently as desired.

During injection, relatively high internal pressures are exerted on the wall of each pair of recesses 36 and 38 forming one of the runner passages 40.

The resultant forces are largely exerted in directions normal to the corresponding lateral faces 20, 22, thereby tending to urge adjacent sector-shaped elements away from each other. However, large components of these forces are balanced because of the circular array of the sector-shaped elements. A second but smaller component acts radially outwardly on clamping ring 14 and is substantially uniformly distributed about its inner surface 34, whereby the clamping ring 14 is subjected to tensile stresses.

Since the forces acting on the sector-shaped elements are primarily compressive, extremely high pressures within runner passages 40 may readily be tolerated.

As previously mentioned, any number of sector-shaped elements 12 may be employed within practicable limits. The largest practicable number is determined by the minimum permissible or feasible transverse dimensions of inner faces 18, nozzles 52 and runner passages 40.

Figure 4:
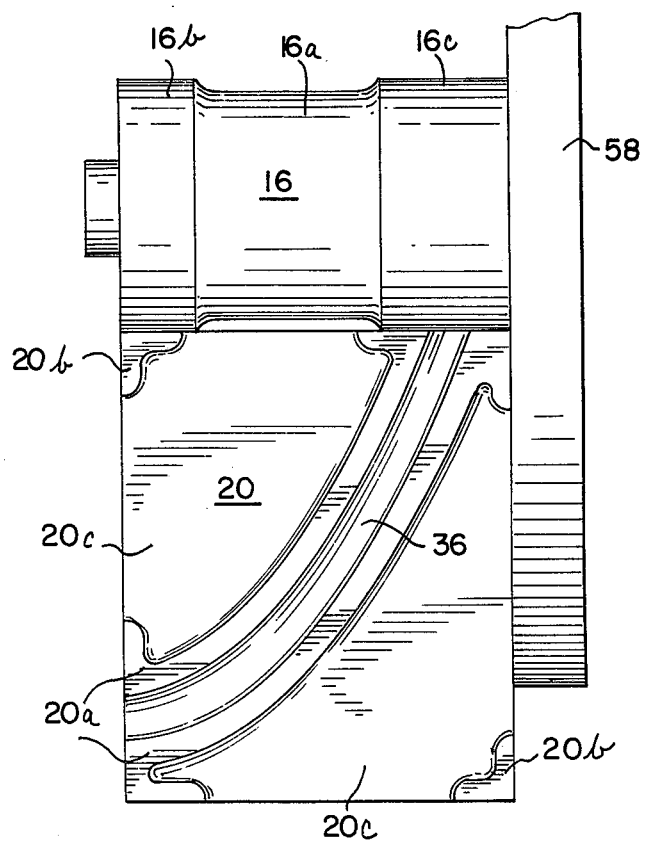
FIG. 4 is a view similar to that of FIG. 2 showing certain modifications in elements of the runner manifold.

Referring now to FIG. 4, modified forms of hub member 16 and lateral face 20 are shown.

The hub member is provided with an annular relieved portion 16a to divide the support surface into two annular unrelieved support portions 16b and 16c in engagement with the inner face of the sector-shaped element. Thus, the compressive forces acting on the hub member and the inner face are concentrated at the consequently reduced zones of engagement. Since one of these zones includes the intersection of recess 36 (and recess 38, not shown in FIG. 4) with the inner face, the sealing effect of such forces will be enhanced.

The modified lateral face 20, which may or may not be employed in association with the modified hub member, is similarly provided with a pair of relieved portions 20c on opposite sides of and spaced from recess 36 to provide a pair of unrelieved coplanar portions 20a lying on either side of and immediately adjacent to the recess. Lateral face 22 (not shown in FIG. 4) is similarly modified to provide a mirror image of face 20. Here again, compressive forces will be concentrated at the unrelieved portions to enhance sealing along the length of the runner passages.

A second pair of unrelieved portions 20b, coplanar with portions 20a, may be provided at locations remote from recess 36 to negate any tendency of the sector-shaped elements to skew relative to the hub member and clamping ring.

It will be noted that a manifold constructed in accordance with the invention provides complete access to the interiors of the runner passages, permitting them to be precisely machined in any desired configuration and in any desired direction. Abrupt changes of direction may be entirely avoided. The runner passages may be formed with varying transverse dimensions along their lengths, or with internal projections, baffles or fluting intended to provide turbulent flow or assist laminar flow. They may be fitted with inserts of any suitable material or internal configuration, including unbroken tubular sleeves to provide a complete seal longitudinally. They may be cleaned conveniently and thoroughly.

Since the runner passages are arranged in a radial array, they may be of equal lengths to provide the same pressure at each nozzle; that is, the pressure drop from inlet to outlet will be the same for each runner passage. This is an important consideration, since it assists the filling of each mold evenly and uniformly.

While the invention has been described in connection with a specific embodiment thereof, it will be un-

What is claimed is:

1. A runner manifold for conducting a synthetic resinous material in a flowable state from a source thereof to a plurality of injection nozzles in an injection molding machine, the manifold comprising: a hub member having an outer support surface, means defining concavity in the hub member adapted to communicate with the material source, and means defining a plurality of ports in the hub member in communication with the concavity; a plurality of sector-shaped elements surrounding the hub member and cooperating to define a radially inner surface complementary to the support surface and in engagement therewith, a radially outer surface, and a pair of opposed end surfaces extending between the radially inner and outer surfaces, each sector-shaped element having a pair of opposed lateral faces extending radially between the radially inner and outer surfaces and intersecting the end surfaces, each lateral face being in engagement with the corresponding lateral face of an adjacent sector-shaped element and having an elongate recess formed therein cooperating with the recess in said corresponding lateral face to define a runner passage having an inlet in communication with one of the ports in the hub member, and an inlet at one of the end surfaces; and a clamping ring surrounding the sector-shaped elements and having an inner surface complementary to and to engagement with the radially outer surface defined by the sector-shaped elements.

2. A runner manifold according to claim 1, including means preventing relative movement between the hub member and the sector-shaped elements in at least one axial direction.

3. A runner manifold according to claim 1, wherein the hub member includes a flange extending radially outwardly of the support surface in engagement with one of the end surfaces defined by the sector-shaped elements.

4. A runner manifold according to claim 1, including a retaining member secured to the hub member and engaging one of the end surfaces defined by the sector-shaped elements.

5. A runner manifold according to claim 1, wherein the hub member includes a hub extension of reduced transverse dimension relative to the support surface and projecting beyond the plane of one of the end surfaces defined by the sector-shaped elements, the manifold a retaining ring carried on the hub extension in engagement with said one end surface, and means securing the retaining ring against movement relative to the hub member.

6. A runner manifold according to claim 1, wherein each lateral face is generally planar and is traversed by the elongate recess therein to deivide the face into two coplanar face portions lying on opposite sides of the recess, each of the face portions being in substantially continuous engagement with the corresponding face portion of an adjacent sector-shaped element.

7. A runner manifold according to claim 1, wherein each lateral face is traversed by the elongated recess therein and includes relieved portions thereof on each side of the recess in spaced relation thereto to provide a pair of unrelieved coplanar face portions lying on opposite sides fo the recess and immediately adjacent thereto, each of the unrelieved face portions being in substantially continuous engagement with the corresponding unrelieved face portion of an adjacent sector-shaped element.

8. A runner manifold according to claim 7, wherein each lateral face includes a second pair of unrelieved face portions coplanar with the first pair of unrelieved face portions and lying on opposite sides of and remote from the elongate recess, each of the second pair of unrelieved face portions being separated from the first pair of unrelieved face portions by one of the relieved portions, each of the second pair of unrelieved face portions being in engagement with the corresponding unrelieved face portion of an adjacent sector-shaped element.

9. A runner manifold according to claim 1, wherein the runner passages intersect the radially inner surface defined by the sector-shaped elements at the inlets of the runner passages, the hub member including a relieved portion dividing the support surface of the hub member into a pair of unrelieved support portions thereof, the ports in the hub member intersecting one of the unrelieved support portions, said one unrelieved support portion being in engagement with the radially inner surface at a zone thereof which includes the runner passage inlets.

10. A runner manifold according to claim 1, wherein the clamping ring is shrink-fitted over the radially outer surface defined by the sector-shaped elements.

11. A runner manifold according to claim 1, including means for heating the sector-shaped elements, the clamping ring being formed of a first material having a predetermined coefficient of expansion, the sector-shaped elements being formed of a second material having a predetermined coefficient of expansion greater than that of the first material, whereby when the heating means is energized, the sector-shaped elements are subjects to compressive stresses.

12. A runner manifold for conduting a synthetic resinous material in a flowable state from a source thereof to a plurality of injection nozzles in an injection molding machine, the manifold comprising: a hub member having a cylindrical outer support, means defining a concavity in one end of the hub member adapted to communicate with the material source, and means defining a plurality of ports in the support surface in communication with the concavity; a plurality of sector-shaped elements surrounding the hub member and cooperating to define a cylindrical radially inner surface complementary to the support surface and in engagement therewith, a cylindrical radially outer surface, a generally planar forward end surface, and a generally planar rearward end surface opposed to the forward end surface, the end surfaces extending between the radially inner and outer surfaces, each sector-shaped element having a pair of opposed lateral faces extending radially between the radially inner and outer surfaces and intersecting the end surfaces, each lateral face being in engagement with the corresponding lateral face of an adjacent sector-shaped element and having an elongate recess formed therein cooperating with the recess in said corresponding lateral face to define a runner passage having an inlet at the radially inner surface aligned with one of the ports in the support surface, and an outlet at the front end surface; and a clamping ring surrounding the sector-shaped elements and having a cylindrical inner surface complementary to and in engagement with the radially outer surface defined by the sector-shaped elements.

13. A runner manifold according to claim 12, wherein the hub member includes an annular flange concentric with and extending radially outwardly of the support surface at the end of the hub member having the concavity, the flange being in engagement with the rearward end surface defined by the sector-shaped elements, the hub member including at the other end thereof a hub extension of reduced transverse dimension relative to the support surface and projecting beyond the plane of the forward end surface defined by the sector-shaped elements, the manifold including a retaining ring carried on the hub extension in engagement with the forward end surface, and means securing the retaining ring against movement relative to the hub member.

14. In an injection molding machine having a source of synthetic resinous material in a flowable state, and a plurality of injection nozzles, a runner manifold for conducting the material from the material source to the nozzles, comprising: a hub member having a cylindrical outer support surface, means defining a concavity in one end of the hub member adapted to communicate with the material source, and means defining a plurality of ports in the support surface in communication with the concavity; a plurality of sector-shaped elements surrounding the hub member and cooperating to define a cylindrical radially inner surface complementary to the support surface and in engagement therewith, a cylindrical radially outer surface concentric with the radially inner surface, a generally planar forward end surface, and a generally planar rearward end surface opposed to the forward end surface and generally parallel therewith, the end surfaces extending between the radially inner and outer surfaces, each sector-shaped element having a pair of opposed lateral faces extending radially between the radially inner and outer surfaces and intersecting the end surfaces, each lateral face having an elongate recess formed therein extending from the radially inner surface to the forward end face, each lateral face having relieved portions thereof on each side of the recess in spaced relation thereto to provide a pair of unrelieved coplanar portions lying on opposite sides of the recess and immediately adjacent thereto, each recess cooperating with the recess in the corresponding lateral face of an adjacent sector-shaped element to define a runner passage having an inlet in the radially inner surface aligned with one of the ports in the support surface, and an outlet at the front end surface, each of the unrelieved face portions being in substantially continuous engagement with the corresponding unrelieved face portion of an adjacent sector-shaped element; and a clamping ring surrounding the sector-shaped elements and having a cylindrical inner surface complementary to and in engagement with the radially outer surface defined by the sector-shaped elements.

15. A runner manifold according to claim 14, wherein each lateral face includes a second pair of unrelieved face portions coplanar with the first pair of unrelieved face portions and lying on opposite sides of and remote from the elongate recess, each of the second pair of unrelieved face portions being separated from the first pair of unrelieved face portions by one of the relieved portions, each of the second pair of unrelieved face portions being in engagement with the corresponding unrelieved face portion of an adjacent sector-shaped element.

16. A runner manifold according to claim 14, wherein the hub member includes a relieved portion dividing the support surface of the hub member into a pair of unrelieved support portions thereof, the ports in the hub member intersecting one of the unrelieved support portions, said one unrelieved support portion being in engagement with the radially inner surface at a zone thereof which includes the runner passage inlets.

17. In a runner manifold comprising means defining a plurality of runner passages for conducting a synthetic resinous material in a flowable state from a source thereof to a plurality of nozzles in an injection molding machine, each of the runner passage being adapted to communicate at one end thereof with the material source and at the other end thereof with one of the nozzles, the improvement comprising the feature that the passage-defining means includes a plurality of sector-shaped elements arranged in a continuous radial array, each sector-shaped element having a pair of opposed radially-extending lateral faces, each lateral face being in engagement with the corresponding lateral face of an adjacent sector-shaped element and having an elongate recess formed therein cooperating with the recess in said corresponding lateral face to define one of the runner passages.

\* \* \* \* \*

UNITED STATES PATENT OFFICE
CERTIFICATE OF CORRECTION

Patent No. 3,923,209   Dated December 2, 1975

Inventor(s) Siegfried S. Roy

It is certified that error appears in the above-identified patent and that said Letters Patent are hereby corrected as shown below:

In the claims:

In column 7, line 28, "inlet" should read -- outlet --. line 30, "to" second occurrence should read -- in --; line 51, after "manifold" the word -- including -- should be inserted; line 57, "deivide" should read -- divide --; line 63, "elongated" should read -- elongate --; line 67, "fo" should read -- of --.

In column 8, line 39, "subjects" should read -- subjected --.

In column 10, line 35, "passage" should read -- passages --

Signed and Sealed this twentieth Day of April 1976

[SEAL]

Attest:

RUTH C. MASON
Attesting Officer

C. MARSHALL DANN
Commissioner of Patents and Trademarks